US012718166B2

(12) United States Patent
Jasionowski et al.

(10) Patent No.: US 12,718,166 B2
(45) Date of Patent: Aug. 25, 2026

(54) QUANTUM RISK ASSESSMENT COMPARISON

(71) Applicant: Kyndryl, Inc., New York, NY (US)

(72) Inventors: Paweł Jasionowski, Wroclaw (PL); Daniel S. Riley, Wake Forest, NC (US); Melissa Melancon, Loveland, CO (US); Jalen Hickman, Louisville, KY (US); Jeffrey Biegel, Saugerties, NY (US); John Chidester, Sautee Nacoochee, GA (US)

(73) Assignee: Kyndryl, Inc., New York, NY (US)

( * ) Notice: Subject to any disclaimer, the term of this patent is extended or adjusted under 35 U.S.C. 154(b) by 155 days.

(21) Appl. No.: 18/828,249

(22) Filed: Sep. 9, 2024

(65) Prior Publication Data

US 2026/0094097 A1 Apr. 2, 2026

(51) Int. Cl.
*G06F 21/57* (2013.01)
*G06Q 10/0635* (2023.01)

(52) U.S. Cl.
CPC ....... *G06Q 10/0635* (2013.01); *G06F 21/577* (2013.01); *G06Q 2220/00* (2013.01)

(58) Field of Classification Search
CPC ............ G06Q 10/0635; G06Q 2220/00; G06F 21/577
See application file for complete search history.

(56) References Cited

U.S. PATENT DOCUMENTS 7,552,480 B1 6/2009 Voss
2002/0138416 A1 9/2002 Lovejoy et al.
2013/0297477 A1 11/2013 Overman et al.
2018/0048669 A1 2/2018 Lokamathe
2019/0378208 A1 12/2019 Woerner et al.
(Continued)

FOREIGN PATENT DOCUMENTS

CN 115375065 11/2022
WO 2023014985 2/2023

OTHER PUBLICATIONS

Chen et al., "Report on Post-Quantum Cryptography", National Institute of Standards and Technology, Internal Report 8105, http://dx.doi.org/10.6028/NIST.IR.8105, Apr. 2016; 15 pages.
(Continued)

*Primary Examiner* — Andrew Suh
(74) *Attorney, Agent, or Firm* — Erik Swanson; Andrew D. Wright; Calderon Safran & Wright P.C.

(57) ABSTRACT

Embodiments receive a plurality of historical risk assessments and a plurality of quantum readiness levels; calculate a plurality of risk dimension metrics based on the plurality of historical risk assessments and the plurality of quantum readiness levels; calculate a plurality of risk assessment attributes dimension metrics based on the plurality of historical risk assessments and the plurality of quantum readiness levels; generate nearest neighbors nomination based on the calculated plurality of risk dimension metrics and the calculated plurality of risk assessment attributes dimension metrics; calculate a confidence of quality metric based on the generated nearest neighbors nomination; and determine that the confidence of quality metric is below a threshold; and execute a cryptography algorithm based on a determination that the confidence of quality metric is below the threshold.

25 Claims, 10 Drawing Sheets

(56) References Cited

U.S. PATENT DOCUMENTS

| | | | | |
|---|---|---|---|---|
| 2020/0137101 | A1 | 4/2020 | Scott et al. | |
| 2021/0075814 | A1* | 3/2021 | Bulut | H04L 63/1433 |
| 2021/0203687 | A1* | 7/2021 | Rabin | H04L 63/105 |
| 2022/0030009 | A1 | 1/2022 | Hasan | |
| 2022/0131888 | A1* | 4/2022 | Kanso | H04L 63/20 |
| 2022/0232031 | A1 | 7/2022 | Bogren et al. | |
| 2022/0237565 | A1 | 7/2022 | Dzierzanowski et al. | |
| 2022/0366332 | A1 | 11/2022 | Duessel | |
| 2023/0222454 | A1* | 7/2023 | Cella | B25J 9/1682 705/28 |
| 2023/0259853 | A1 | 8/2023 | Zhang et al. | |
| 2023/0342691 | A1* | 10/2023 | Rapowitz | G06Q 10/0635 |
| 2023/0421597 | A1 | 12/2023 | Galinski et al. | |
| 2025/0150466 | A1* | 5/2025 | Miles | H04L 63/1416 |

OTHER PUBLICATIONS

Nist, "Post-Quantum Cryptography PQC", https://csrc.nist.gov/projects/post-quantum-cryptography, Published Aug. 13, 2024; 5 pages.

Alsalman, "Accelerating Quantum Computing Readiness: Risk Management and Strategies for Sectors", Scientific Research Publishing, Journal of Quantum Information Science, https://www.scirp.org/journal/jqis, Jun. 13, 2023; pp. 33-44.

Siviour et al., "Quantum Safe: An Approach to Manage the Threat of Quantum Computers", Kyndryl, https://www.kyndryl.com/us/en/perspectives/articles/2023/08/quantum-computing, Sep. 1, 2023; 11 pages.

Mell et al., "The NIST Definition of Cloud Computing", NIST, Special Publication 800-145, Sep. 2011, 7 pages.

* cited by examiner

170

QUANTUM RISK ASSESSMENT COMPARISON

BACKGROUND

Aspects of the present invention relate generally to a quantum risk assessment comparison and, more particularly, to systems and methods for a quantum risk assessment comparison which focuses on different dimensions of a risk assessment and different vulnerability severities.

Quantum risk assessment is a process to assess a risk connected with data exposure. In particular, quantum safe algorithms identify and protect vulnerable data that occurs in quantum computing.

SUMMARY

In a first aspect of the invention, there is a computer-implemented method including: receiving, by a computing device, a plurality of historical risk assessments and a plurality of quantum readiness levels; calculating, by the computing device, a plurality of risk dimension metrics based on the plurality of historical risk assessments and the plurality of quantum readiness levels; calculating, by the computing device, a plurality of risk assessment attributes dimension metrics based on the plurality of historical risk assessments and the plurality of quantum readiness levels; generating, by the computing device, a nearest neighbors nomination based on the calculated plurality of risk dimension metrics and the calculated plurality of risk assessment attributes dimension metrics; calculating, by the computing device, a confidence of quality metric based on the generated nearest neighbors nomination; determining, by the computing device, that the confidence of quality metric is below a threshold; and executing, by the computing device, a cryptography algorithm based on a determination that the confidence of quality metric is below the threshold.

In another aspect of the invention, there is a computer program product including one or more computer readable storage media having program instructions collectively stored on the one or more computer readable storage media. The program instructions are executable to: receive a plurality of historical risk assessments and a plurality of quantum readiness levels; calculate a plurality of risk dimension metrics based on the plurality of historical risk assessments and the plurality of quantum readiness levels; calculate a plurality of risk assessment attributes dimension metrics based on the plurality of historical risk assessments and the plurality of quantum readiness levels; generate a nearest neighbors nomination based on the calculated plurality of risk dimension metrics and the calculated plurality of risk assessment attributes dimension metrics; calculate a confidence of quality metric based on the generated nearest neighbors nomination; determine that the confidence of quality metric is below a threshold; and execute a cryptography algorithm based on a determination that the confidence of quality metric is below the threshold.

In another aspect of the invention, there is a system including a processor, a computer readable memory, one or more computer readable storage media, and program instructions collectively stored on the one or more computer readable storage media. The program instructions are executable to: receive a plurality of historical risk assessments and a plurality of quantum readiness levels; calculate a plurality of risk dimension metrics based on the plurality of historical risk assessments and the plurality of quantum readiness levels; calculate a plurality of risk assessment attributes dimension metrics based on the plurality of historical risk assessments and the plurality of quantum readiness levels; generate a nearest neighbors nomination based on the calculated plurality of risk dimension metrics and the calculated plurality of risk assessment attributes dimension metrics; determine that a historical nearest neighbors nomination is not within a nomination threshold of the generated nearest neighbors nomination; train a reinforcement machine learning (ML) model based on the historic nearest neighbors nomination not being within the nomination threshold of the generated nearest neighbors nomination; calculate a confidence of quality metric based on the generated nearest neighbors nomination; determine that the confidence of quality metric is below a threshold; and execute a cryptography algorithm based on a determination that the confidence of quality metric is below the threshold.

In another aspect of the invention, there is a computer-implemented method including: receiving, by a computing device, a plurality of historical risk assessments and a plurality of quantum readiness levels; calculating, by the computing device, a plurality of risk dimension metrics based on the plurality of historical risk assessments and the plurality of quantum readiness levels; calculating, by the computing device, a plurality of risk assessment attributes dimension metrics based on the plurality of historical risk assessments and the plurality of quantum readiness levels; generating, by the computing device, a nearest neighbors nomination based on the calculated plurality of risk dimension metrics and the calculated plurality of risk assessment attributes dimension metrics; determining, by the computing device, that a historical nearest neighbors nomination is not within a nomination threshold of the generated nearest neighbors nomination; training, by the computing device, a reinforcement machine learning (ML) model based on the historic nearest neighbors nomination not being within the nomination threshold of the generated nearest neighbors nomination; running, by the computing device, the trained reinforcement ML model to output a type of nearest neighbor nomination metric based on the training of the reinforcement ML model; calculating, by the computing device, a confidence of quality metric based on the generated nearest neighbors nomination; determining, by the computing device, that the confidence of quality metric is below a threshold; and executing, by the computing device, a cryptography algorithm based on a determination that the confidence of quality metric is below the threshold.

In another aspect of the invention, there is a computer program product including one or more computer readable storage media having program instructions collectively stored on the one or more computer readable storage media. The program instructions are executable to: receive a plurality of historical risk assessments and a plurality of quantum readiness levels; calculate a plurality of risk dimension metrics based on the plurality of historical risk assessments and the plurality of quantum readiness levels; calculate a plurality of risk assessment attributes dimension metrics based on the plurality of historical risk assessments and the plurality of quantum readiness levels; generate a first nearest neighbors nomination based on the calculated plurality of risk dimension metrics and the calculated plurality of risk assessment attributes dimension metrics; determine that a historical nearest neighbors nomination is not within a nomination threshold of the generated first nearest neighbors nomination; train a reinforcement machine learning (ML) model based on the historic nearest neighbors nomination not being within the nomination threshold of the generated first nearest neighbors nomination; run the trained reinforcement ML model to output a type of nearest neighbor nomination metric based on the training of the reinforcement ML model; generate a second nearest neighbors nomination based on the type of the nearest neighbor nomination metric; calculate a confidence of quality metric based on the generated second nearest neighbors nomination; determine that the confidence of quality metric is above a threshold; and review the confidence of quality metric based on a determination that the confidence of quality metric is above the threshold.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
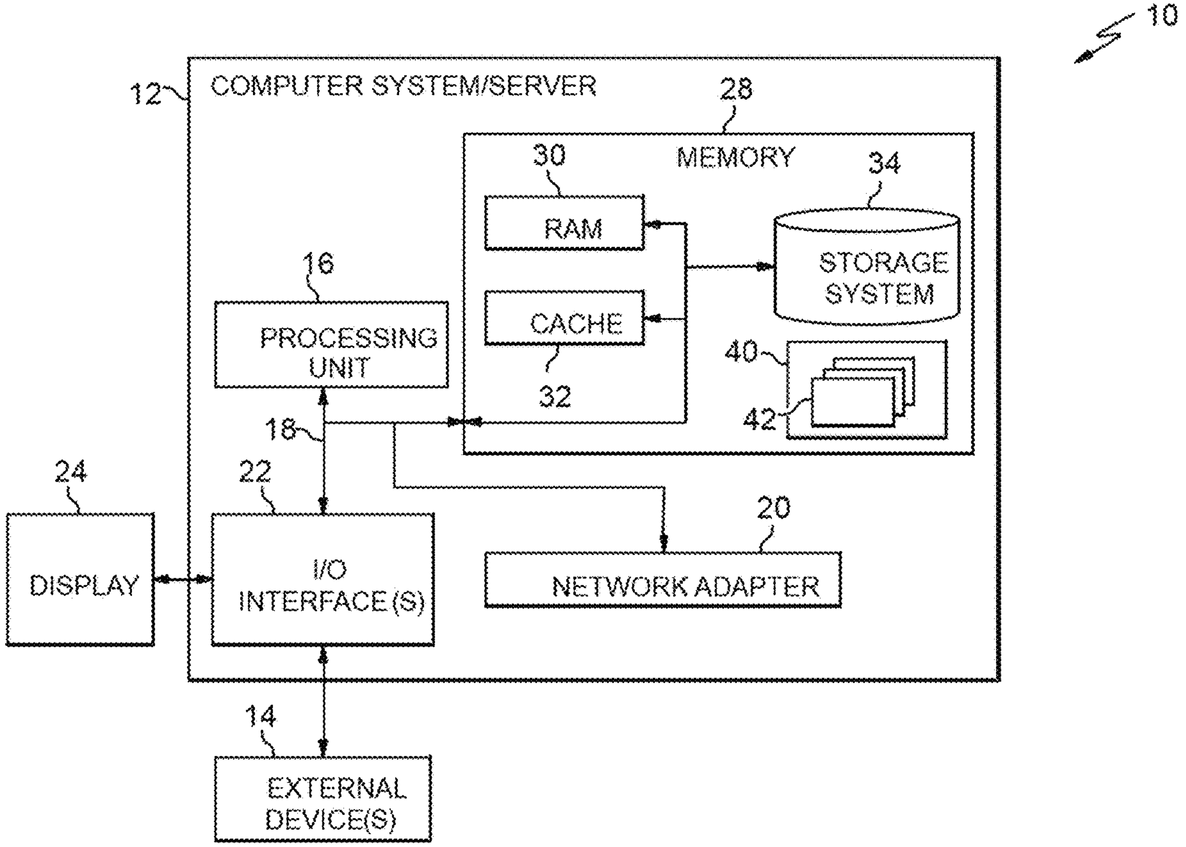
FIG. 1 depicts a cloud computing node according to an embodiment of the present invention.

Aspects of the present invention relate generally to a quantum risk assessment comparison and, more particularly, to systems and methods for a quantum risk assessment comparison which focuses on different dimensions of a risk assessment and different vulnerability severities. Aspects of the present invention may be implemented as a system, method, or computer program product. The system, method, or computer program product identifies vulnerable data and utilizes quantum safe algorithms to protect data from being stolen during execution of quantum decrypting algorithms. In addition, the system, method, or computer program product provides data-based decision support analytics to identify risks and propose treatment actions to provide confidence around a proposed risk assessment. The system, method, and/or computer program product utilizes a quantum risk assessment comparison algorithm to create an analytics engine to nominate historical assessments from data sources which have a similar assessment to a current data source. Accordingly, the system, method, and/or computer program product identifies additional risk areas by analyzing business features from historical assessments of historical data sources. Further, the system, method, and/or computer program product utilizes a neighbors nominations algorithm to support a decision-making process to provide analytics regarding challenges, blocking points, incorrect risks, and lesson learns with risk consultations. The systems and methods provided herein may be computer implemented methods.

More specifically, the system, method, or computer program product described herein provides nomination of similar risk assessments based on defined risk dimension metrics such as quantum readiness and attributes dimension metrics. The system, method, or computer program product also calculates a level of quantum risk assessment confidence quality based on graphical representations of historical risk assessments. Further, the system, method, or computer program product also utilizes a reinforcement machine learning (ML) model and algorithm to identify an optimal type of nearest neighbor nomination metric. In further embodiments, the system, method, or computer program product inputs the identified optimal type of nearest neighbor nomination metric to a nearest neighborhood nomination (NNN) algorithm for improving an accuracy of the nearest neighbors nomination and the confidence of quality metric. Embodiments of the present invention build an ML model to determine quantum readiness level weights and create a classification model to determine a best class for risk impacts based on historical data containing predefined attributes. Further embodiments of the present invention compare assessments by using attributes to nominate nearest neighbors. Aspects of the present invention compute a level of confidence connected to a quality of a risk assessment.

The system, method, or computer program product provides a data-based decision support analytics engine for a quantum risk assessment use case. In this way, the present invention is directed to security risks associated with quantum computing. Further, the system, method, or computer program product is also applicable to other risk assessment comparison fields in response to changing the appropriate weights and levels for other risk assessment comparison fields. In addition, embodiments of the present invention utilize machine learning (ML) models to calculate the appropriate weights and levels for the other risk assessment comparison fields based on business factors such as risk events having different impacts on a final business risk, risk treatment actions having different implementation probabilities on account policies, and a proposed set of treatment actions providing a residual risk result. Accordingly, implementations of the present invention provide data-based decision analytics which help to identify risks associated with cyberattacks, data breaches, and other security threats caused by quantum computing, suggest a best set of treatment actions, and build confidence around the proposed risk assessment.

In contrast, known public-key cryptographic algorithms and systems are vulnerable to security attacks through quantum factorization algorithms. Accordingly, known public-key cryptographic algorithms and systems do not address security vulnerabilities that may exist due to multi q-bits quantum computers and quantum algorithms. In particular, known quantum computers may gain enough computational power to break public key encryption methods used in known cybersecurity systems. Further, known systems and methods do not protect data from security attacks and vulnerabilities due to quantum computing. The systems, methods, and computer program products as described herein make improvements on known systems by identifying vulnerable data and utilizing quantum safe algorithms to protect the vulnerable data such that embodiments of the present invention are resistant to security vulnerabilities during quantum computing and quantum decrypting algorithms.

Implementations of the present invention are also rooted in computer technology. For example, the steps of training, by a computing device, a reinforcement machine learning (ML) model based on a generated nearest neighbors nomination (NNN), and running, by the computing device, the reinforcement ML model based on the generated NNN and historical NNN to output an optimal type of nearest neighbor nomination metric are computer-based and cannot be performed in the human mind. For example, training the ML model based on the generated NNN, and running the reinforcement ML model based on the generated NNN and historical NNN to output an optimal type of nearest neighbor nomination metric is by definition, performed by a computer and cannot practically be performed in the human mind (or with pen and paper) due to the complexity and massive amounts of calculations involved. Given the scale and complexity of training and running the reinforcement ML model, it is simply not possible for the human mind, or for a person using pen and paper, to perform the number of calculations involved in outputting an optimal type of nearest neighbor nomination metric in real-time, amongst other features described herein that are also root in computer technology. In further aspects of the present invention, embodiments are directed to the field of quantum computing, which is rooted in computer technology.

It should be understood that, to the extent implementations of the invention collect, store, or employ personal information provided by, or obtained from, individuals (for example, users associated with review of confidence of quality metrics), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
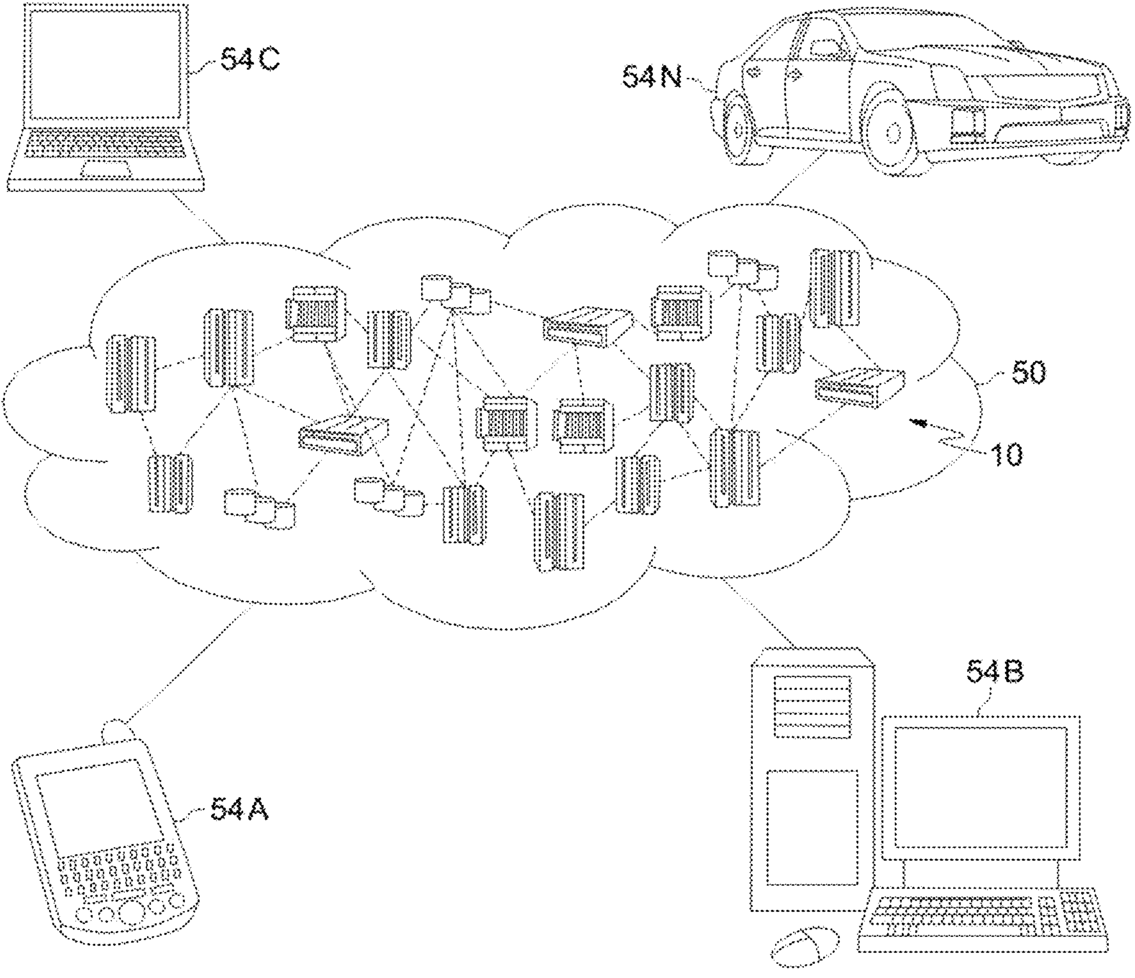
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
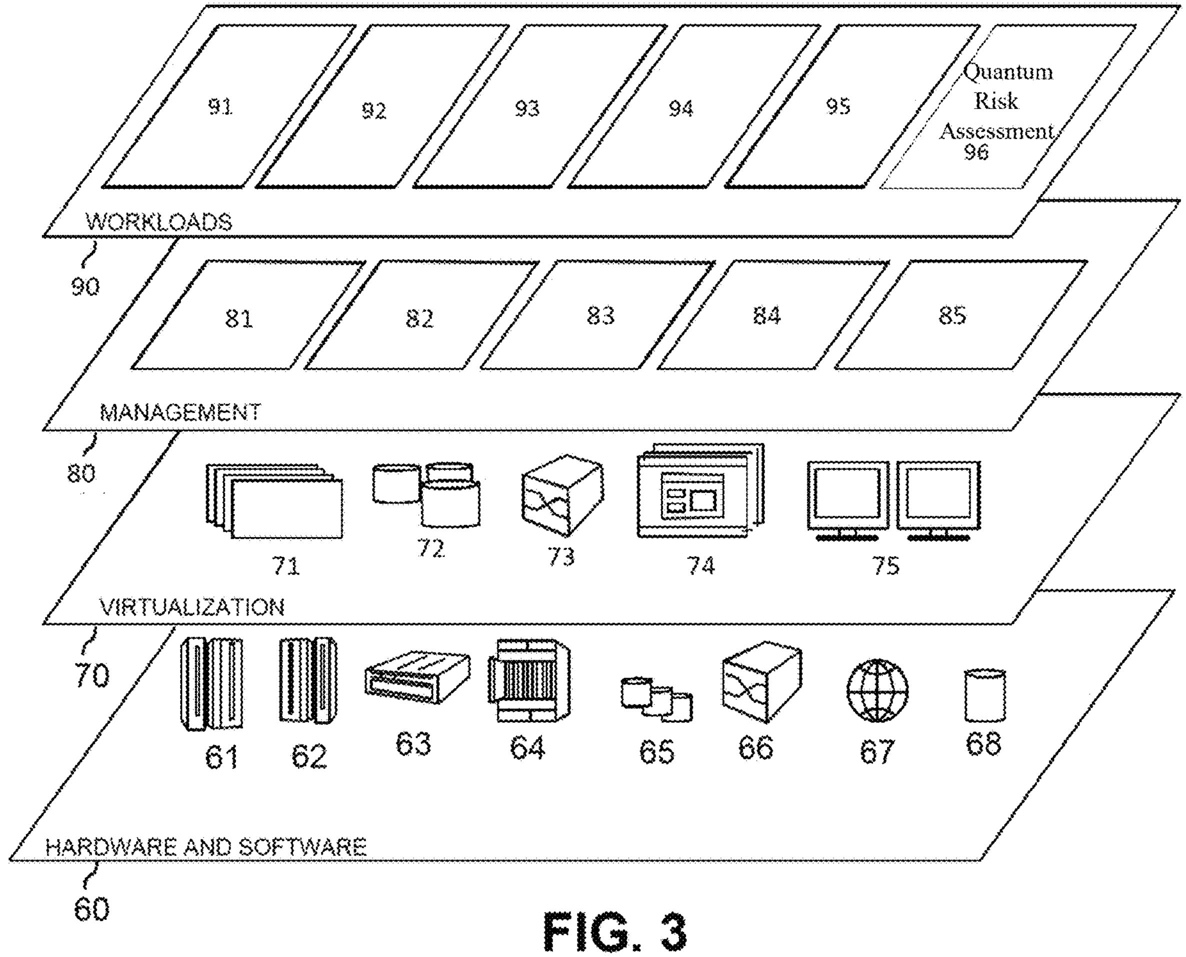
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and quantum risk assessment 96.

Implementations of the invention may include a computer system/server 12 of FIG. 1 in which one or more of the program modules 42 are configured to perform (or cause the computer system/server 12 to perform) one of more functions of the quantum risk assessment 96 of FIG. 3. For example, the one or more of the program modules 42 of the dynamic optimization 96 may be configured to: receive a plurality of historical risk assessments and a plurality of quantum readiness levels; calculate a plurality of risk dimension metrics based on the plurality of historical risk assessments and the plurality of quantum readiness levels; calculate a plurality of risk assessment attributes dimension metrics based on the plurality of historical risk assessments and the plurality of quantum readiness levels; generate nearest neighbors nomination based on the calculated plurality of risk dimension metrics and the calculated plurality of risk assessment attributes dimension metrics; determine that a historical neighbors nomination is not within a nomination threshold of the generated neighbors nomination; train a reinforcement machine learning (ML) model based on the historical nearest neighbors nomination not being within the nomination threshold of the generated nearest neighbors nomination; run the trained reinforcement ML model to output a type of nearest neighbor nomination metric based on the training of the reinforcement ML model; calculate a confidence of quality metric based on the generated nearest neighbors nomination; determine that the confidence of quality metric is below a threshold; and execute a cryptographic algorithm based on a determination that the confidence of quality metric is below the threshold.

Figure 4:
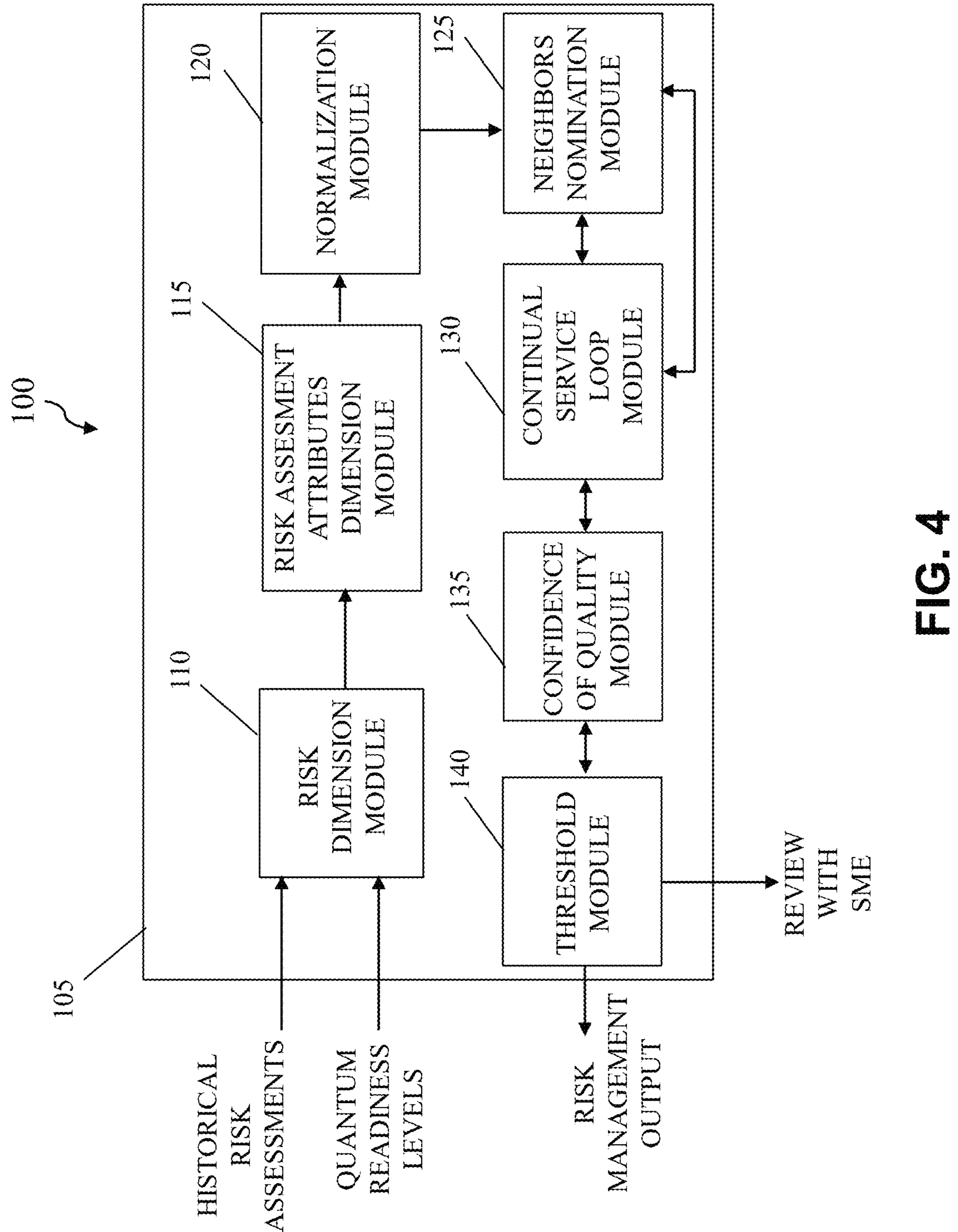
FIG. 4 shows a block diagram of a quantum risk assessment system in accordance with aspects of the present invention.

FIG. 4 shows a block diagram of a quantum risk assessment system in accordance with aspects of the invention. In embodiments, the quantum risk assessment system 100 comprises a quantum risk assessment environment 105 which includes a risk dimension module 110, a risk assessment attributes dimension module 115, a normalization module 120, a neighbors nomination module 125, a continual service loop module 130, a confidence of quality module 135, and a threshold module 140, each of which may comprise one or more program modules such as program modules 42 described with respect to FIG. 1 and the quantum risk assessment 96 of FIG. 3.

The quantum risk assessment system 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments of FIG. 4, the quantum risk assessment system 100 includes a plurality of risk assessments {ra_1, . . . , ra_n}, and for each ra_i, there is an assigned maximum j items which represent assessed risk events, risk levels, and a chosen set of treatment actions. In further embodiments, each of the assessed risk events are assigned to a quantum readiness category from a set Q. In aspects of the present invention, the set Q comprises a set which represents a time when quantum technology is expected to be available to cause a risk challenge. In embodiments, each risk assessment considers risk assessment attributes, such as a geographic location, a country, a market, a contract value, an industry sector, a creation/decision time, etc. For example, the risk dimension module 110 includes a first data form as shown below:

```
{
ra_i;
   Risk assessment attributes {a_1,..., a_k}
   Risk assessment answers {r_1,..., r_j}
   Treatment actions {ta_11,..., ta_js}
   ra_i(j) in q, q in Q
i=1,..., n
}
```

(First Data Form).

In further embodiments, the quantum risk assessment system 100 uses a set of metrics to compare different dimensions of risk assessment. For example, the quantum risk assessment system 100 calculates a risk dimension which determines how close ra_i1 and ra_i2 are in terms of assessed risk. In a further example, the quantum risk assessment system 100 calculates a risk assessment attributes dimension which determines how close ra_i1 and ra_i2 are in terms of their attributes. In another example, the quantum risk assessment system 100 calculates a risk assessment quality dimension which determines a confidence level with respect to whether the risk assessment ra has sufficiently good quality based on available information in a dataset.

In embodiments of FIG. 4, the risk dimension module 110 receives historical risk assessments and quantum readiness levels from an external system (e.g., external quantum computing system) and calculates a plurality of risk dimension metrics based on the historical risk assessments and the quantum readiness levels. In aspects of the present invention, the historical risk assessments are stored in a database in the external quantum computing system. In further embodiments, the risk determination module 110 calculates a first risk dimension metric p_1 which corresponds with different between risk levels. In further embodiments, the risk levels comprise a plurality of levels including low, medium, high, very high, exceptional, and not available (NA). In aspects of the present invention, the risk determination module 110 calculates the first risk dimension metric p_1 using Equation 1 as follows:

$$p\_1^p(r_p, ra, \text{ra\_i}) = \begin{cases} 0 & \text{if } ra(rp) = \text{ra\_i}(rp) \\ 1 & \text{if } ra(rp) \neq \text{ra\_i}(rp) \end{cases}. \quad \text{(Equation 1)}$$

In embodiments of Equation 1, the risk determination module 110 calculates the first risk dimension metric p_1 by checking one by one if the risk $r_p$, p=1, . . . , j is in a same level on ra and ra_i for p_1P ($r_p$, ra, ra_i). In aspects of the present invention, in Equation 1, ra(r_i) comprises a risk level of risk r_1 for risk assessment ra. Further, weights $w_q$ represent quantum readiness levels. In particular, the weights $w_q$ place weighted importance for risk connected to quantum readiness levels of the set Q. In further embodiments, the quantum readiness levels of the set Q are critical for a business perspective. Accordingly, the risk determination 110 calculates the first risk dimension metric p_1 using Equation 2 as follows:

$$p\_1(ra, \text{ra\_i}) = \sum_{p=1}^{j} w_q * p\_1^p(r_p, ra, \text{ra\_i}). \quad \text{(Equation 2)}$$

In embodiments of FIG. 4, the risk determination module 110 calculates a second risk dimension metric p_2 which corresponds to a difference based on numerical values of risk values. For example, rl comprises a mapping of {not available (NA)→0, low→1, medium→2, . . . , critical→5}. Accordingly, the risk determination 110 calculates the second risk dimension metric p_2 which is a calculated difference between assessed risks using Equation 3 as follows:

$$p\_2^p(r_p, ra, \text{ra\_i}) = |r1(ra(r_p)) - r1(\text{ra\_i}(r_p))|. \quad \text{(Equation 3)}$$

In FIG. 4, the risk determination 110 calculates the first risk dimension metric p_2 using Equation 4 as follows:

$$p\_2(ra, \text{ra\_i}) = \sum_{p=1}^{j} w_q * p\_2^p(r_p, ra, \text{ra\_i}). \quad \text{(Equation 4)}$$

Further, in aspects of the present invention, the risk determination 110 calculates the first risk dimension metric p_2 using p_2P ($r_p$, ra, ra_i). In further embodiments, the risk dimension 110 calculates p_2$^p$ ($r_p$, ra, ra_i) in a similar manner as p_1$^p$ ($r_p$, ra, ra_i) in Equation 1.

In an example of FIG. 4, p_1 and p_2 are significantly different (i.e., consider $w_q$=1 for all risks) and are represented by the following Table 1 as follows:

TABLE 1

| | ra | ra_1 | ra_2 |
|---|---|---|---|
| Risk 1 | L | M | L |
| Risk 2 | L | M | L |
| Risk 3 | L | M | E |

In Table 1 above, the risk determination 110 calculates p_1(ra,ra_1)=3 and p_1(ra,ra_2)=1. In other words, ra_2 is closer to ra than ra_1 in terms of p_1. Further, in Table 1 above, the risk determination 110 calculates p_2 (ra,ra_1)−3 and p_2 (ra,ra_2)=4. In other words, ra_1 is closer to ra than ra_2 in terms of p_2. Further, in aspects of the present invention, p_1 represents how far risk assessments are in terms of identical assessed risks. Thus, p_1 is useful when finding assessments where the most identical assessed risks occur. In further embodiments of the present invention, p_2 represents how far risk assessments are in terms of closely assessed risks. Thus, p_2 is useful when highlighting the one exceptional risk that can cause a situation to indicate that the assessments are completely different.

In embodiments of FIG. 4, the risk determination module 110 calculates a third risk dimension metric p_3 in terms of treatment actions. For example, p_3 is zero in response to a set of treatment actions (ta's) being the same for a particular risk in both risk assessments and p_3 is one in other situations. Accordingly, the p_3 is a weighted sum of all risk where weights $w_q$ represent quantum readiness levels. In particular, the risk determination module 110 calculates the third risk dimension metric p_3 by determining assessments where similar treatment actions were applied.

In aspects of the present invention, the risk determination module 110 calculates the third risk dimension metric p_3 using Equation 5 as follows:

$$p\_3^p(ra, \text{ra\_i}) = \begin{cases} 0 & \text{if } \{\text{ta\_p1}, \ldots, \text{ta\_pj1}\} \text{ for } = r_p \text{ in } ra = \\ & \{\text{ta\_p1}, \ldots, \text{ta\_pj2}\} \text{ for } r_p \text{ in ra\_i} \\ 1 & \text{otherwise} \end{cases}. \quad \text{(Equation 5)}$$

Accordingly, the risk determination 110 calculates the third risk dimension metric p_3 using Equation 6 as follows:

$$p\_3(ra, \text{ra\_i}) = \sum_{p=1}^{j} w_q * p\_3^p(r_p, ra, \text{ra\_i}). \quad \text{(Equation 6)}$$

In Equation 6, p_3 has a separate business value in terms of treatments actions. In other words, p_3 comprises assessments where the most similar treatment actions are applied.

In further embodiments of FIG. 4, the risk determination module 110 calculates a final metric p by calculating a weighted average of the first risk dimension metric p_1, the second risk dimension metric p_2, and the third risk dimension metric p_3 using Equation 7 below:

$$p = \text{average}(w\_1 * p\_1, w\_2 * p\_2, w\_3 * p\_3). \quad \text{(Equation 7)}$$

In embodiments of FIG. 4, w_i, i=1, 2, and 3 are weighted averages which are defined by business needs according to focus areas. For example, if w_1=1, w_2=0, and w_3=0, the risk determination module 110 calculates the final metric p by performing a comparison which is focused on finding similarly assessed risks in terms of risk levels in the weighted average. In another example, if w_1=1, w_2=1, and w_3=1, the risk determination module 110 calculates the final metric p by performing a comparison where all three factors are treated equally in the weighted average. The risk determination module 110 sends the first risk dimension metric p_1, the second risk dimension metric p_2, the third risk dimension metric p_3, the final metric p, the historical risk assessments, and the quantum readiness levels to the risk assessment attributes dimension module 115.

In FIG. 4, the risk assessment attributes dimension module 115 calculates a risk assessment attributes dimension metric α by checking each attribute {a_1, . . . , a_k}. In this situation, the risk assessment attributes dimension module 115 compares a risk assessment to attributes assigned to each risk assessment attribute ra. For example, the attributes can relate to geography or region of an account, such as country, market, or different dimensions of the account. In particular, the different dimensions of the contract can include total contract value, industry sector, creation/decision time, etc. Accordingly, the risk assessment attributes dimension module 115 calculates the assessment attributes dimension metric α using Equation 8 as follows:

$$\alpha^s(a\_s, ra, ra\_i) = \begin{cases} 0 & \text{if } a\_s \text{ for } ra = a\_s \text{ for } ra\_i \\ 1 & \text{if } a\_s \text{ for } ra \neq a\_s \text{ for } ra\_i \end{cases}. \quad \text{(Equation 8)}$$

In embodiments, the risk assessment attributes dimension module 115 calculates the risk assessment attributes dimension metric α using Equation 9 as follows:

$$\alpha(ra, ra\_i) = \sum_{s=1}^{k} w_s * \alpha^s(a_s, ra, ra\_i). \quad \text{(Equation 9)}$$

In embodiments of Equation 6, $w_s$ are weights of attributes defined by a business. For example, by setting up the appropriate the $w_s$ as 1 and rest as 0, the risk assessment attributes dimension module 115 compares only those risk attributes ra's which are from a same attribute (e.g., from a same country). The risk assessment attributes dimension module 115 sends the first risk dimension metric p_1, the second risk dimension metric p_2, the third risk dimension metric p_3, the final metric p, the risk assessment attributes dimension metric α, the historical risk assessments, and the quantum readiness levels to the normalization module 120.

In FIG. 4, the normalization module 120 normalizes the first risk dimension metric p_1, the second risk dimension metric p_2, the third risk dimension metric p_3, and the final metric p by dividing the results of each of these metrics by a maximum possible value of each of these metrics for a set of all risk assessments. The normalization module 120 also normalizes the risk assessment attributes dimension metric α by a similar process. The normalization module 120 sends the normalized final metric p and the normalized risk assessment attributes dimension metric α to the neighbors nomination module 125.

In embodiments of FIG. 4, the neighbors nomination module 125 generates a graphical representation of the risk assessment attributes dimension metric α and the final metric p. In further embodiments, the neighbors nomination module 125 generates the graphical representation which includes a square of [0,1]×[1,0] in which the final metric p is on the x-axis and the risk assessment attributes dimension metric α is on the y-axis. In aspects of the present invention, the neighbors nomination module 125 creates the graphical representation which includes the square of [0,1]×[1,0] in which the risk assessment attributes dimension metric α and the final metric p are normalized to [0,1] and all points representing different risk assessments ra are plotted in the square of [0,1]×[1,0]. In further embodiments, a risk assessment ra is situated in a bottom left corner. However, embodiments are not limited to this example. In further embodiments, the neighbors nomination are defined in different ways according to a business need (i.e., a business input on a type of K nearest neighbor metric). For example, the neighbors nomination can represent only those points with the same attributes, only those points with the same risk levels, only those points which focus on attributes, only those points which focus on risk levels, only those points which have different metrics than Euclidian, and K-nearest neighbors metrics.

Figure 5:
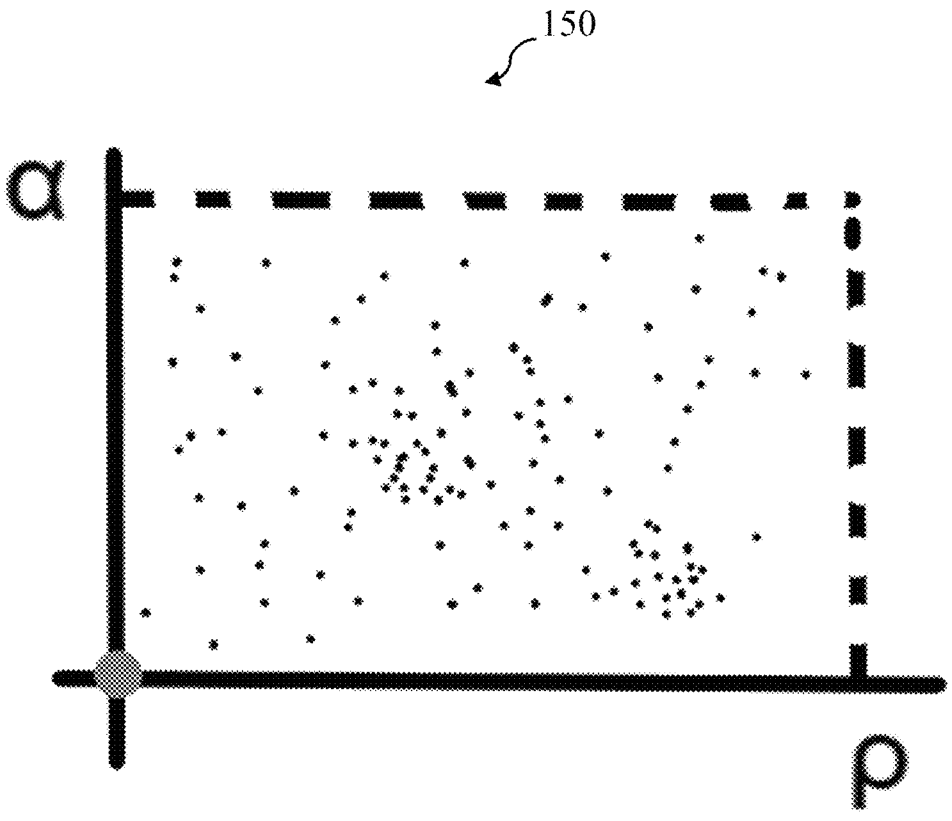
FIGS. 5 and 6 show examples of neighbors nomination graphs of the quantum risk assessment system in accordance with aspects of the present invention.
Figure 6:
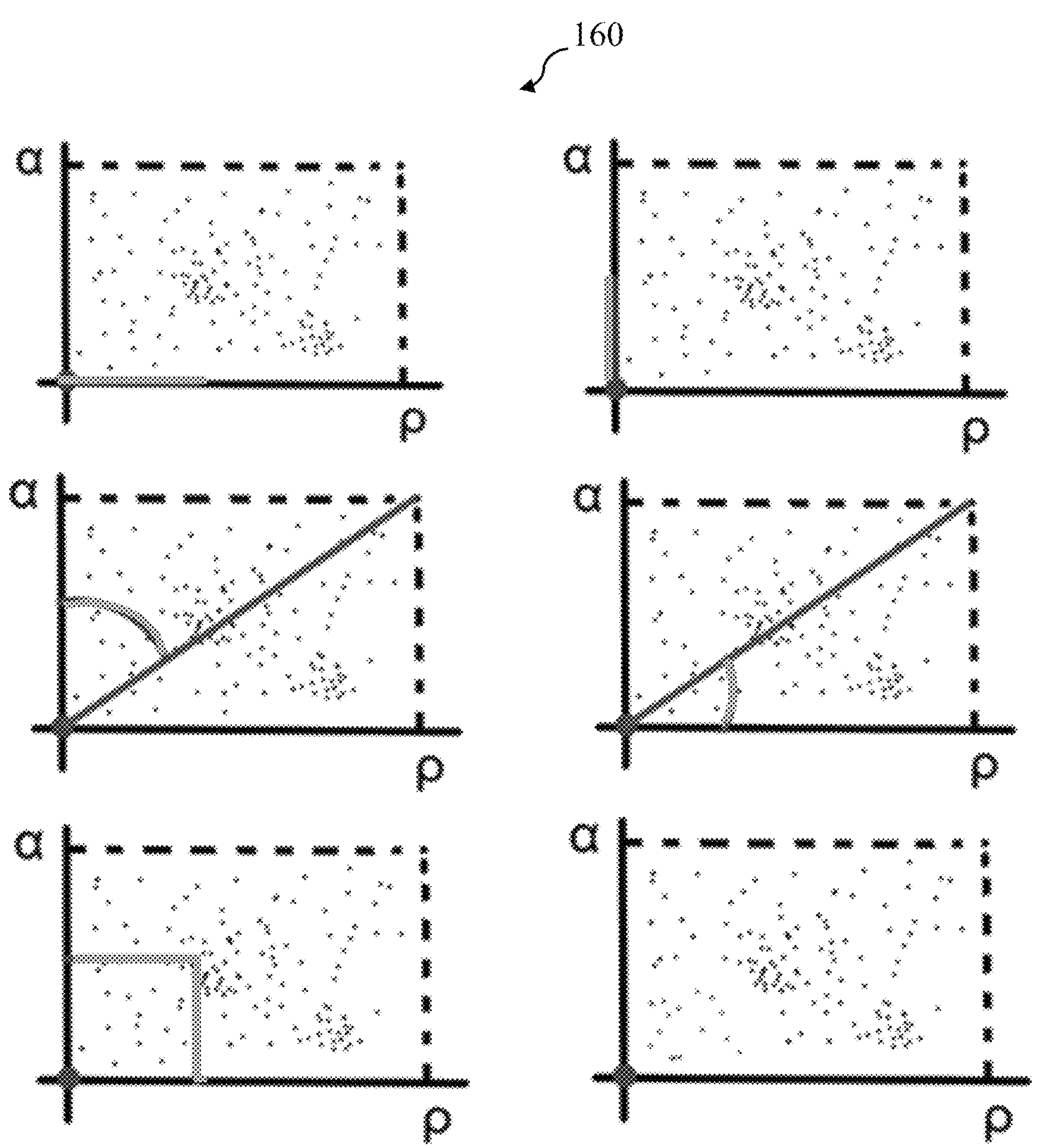

In further aspects of the present invention, the neighbors nomination module 125 generates a graphical representation of the current neighbors nomination. In aspects of the present invention, a nomination K can include nearest points to (0,0). In embodiments, when points are nominated only from the x-axis (where the risk assessment attributes dimension metric α=0), the points represent only those neighbors with the same attributes. Another version of the nomination scheme would be the risk assessment attributes dimension metric α<a, a in (0,1), in which the nomination is focused on attributes rather than risks. In further embodiments, when points are nominated only from the y-axis (where the final metric p=0), the points represent only those neighbors with the same risk levels. Another version of this nomination schema would be the final metric p<r, r in (0,1), in which the nomination is focused only on risks than attributes. In aspects of the present inventio, the K nearest neighbors are taken only by the radial ε from (0,0), or any other non-Euclidian metric defined on the plot according to the business need. Examples of neighbor nomination graphs are shown in FIGS. 5 and 6.

In further embodiments of FIG. 4, the neighbors nomination module 125 compares the current neighbors nomination with historical neighbors nomination. In an example, the historical neighbors nomination may be stored in a historical nomination database. The neighbors nomination module 125 outputs the current nearest neighbors nomination and the historical neighbors nomination to the continual service loop module 130 in response to the current neighbors nomination being outside a nomination threshold value of the historical neighbors nomination. In another situation, the neighbors nomination 125 outputs the graphical representation of the current neighbors nomination to the confidence of quality module 135 in response to the current neighbors nomination being within the nomination threshold value of the historical neighbors nomination.

In embodiments of FIG. 4, the continual service loop module 130 trains a reinforcement machine learning (ML) model based on the current neighbors nomination. In further embodiments of FIG. 4, the continual service loop module 130 runs the reinforcement ML model to identify an optimal type of nearest neighbor nomination metric and outputs the optimal type of nearest neighbor nomination metric (i.e., an optimal type of K nearest neighbor nomination metric) back to the neighbors nomination module 125 for generating an optimized neighbors nomination. In aspects of the present invention, the reinforcement ML model is run to define the optimal type of nearest neighbor nomination metric which corresponds to a desired result of a user. In this situation, the reinforcement ML model is run to improve the accuracy of generating the neighbors nomination. In particular, the reinforcement ML model improves the accuracy of generating the neighbors nomination based on historical data, which is better than a known method of a user arbitrarily choosing a type of nearest neighbor metric based on intuition.

Figure 7:
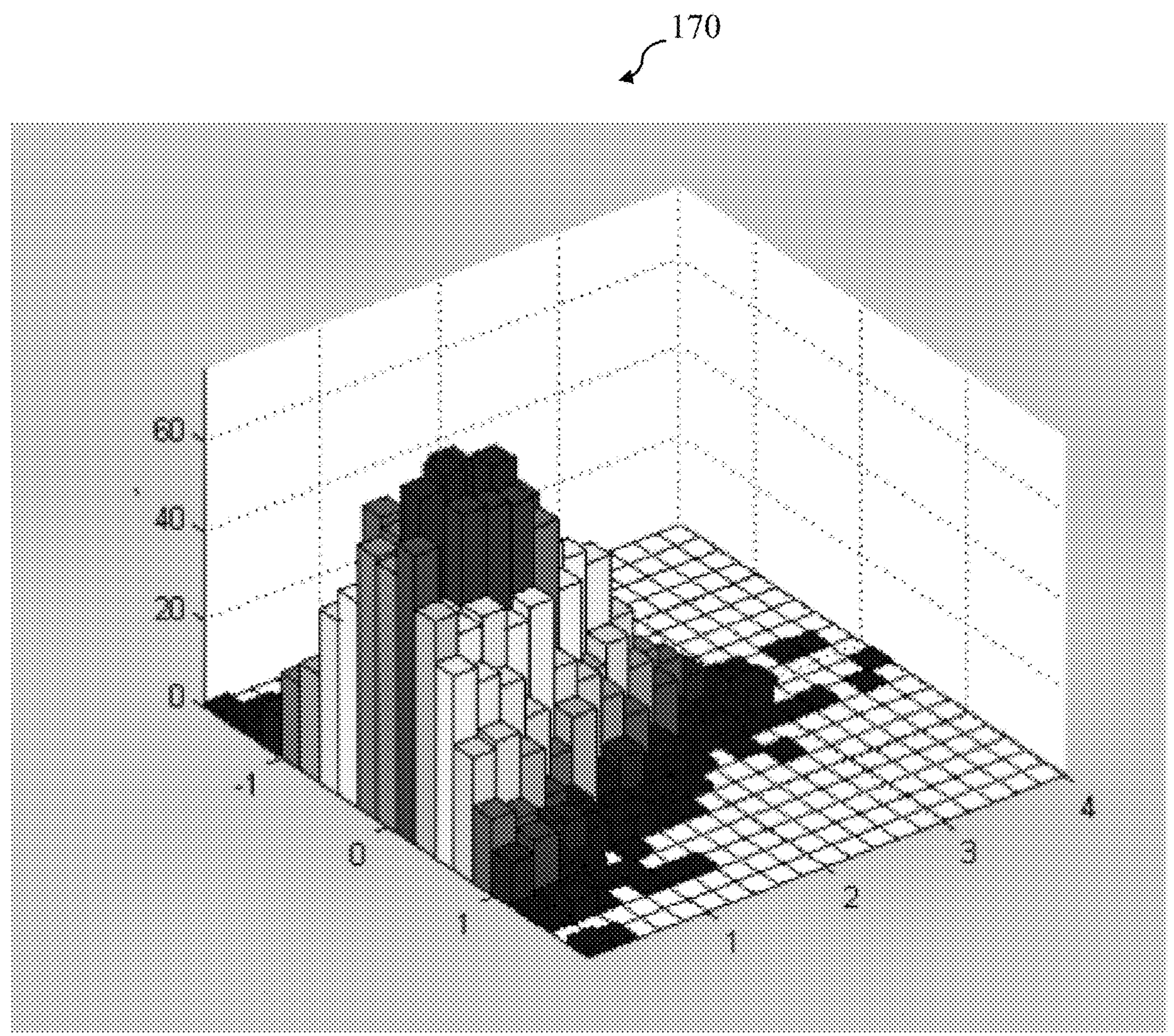
FIG. 7 shows an example of a confidence of quality graph of the dynamic optimization system in accordance with aspects of the present invention.

In FIG. 4, the confidence of quality module 135 receives the graphical representation of the current neighbors nomination and divides the square of [0,1]×[1,0] into small subsets. For example, the confidence of quality module 135 divides the square into small subsets of {[0,0.1], [0.1,0.2], . . . , [0.9,1]}×{[0,0.1], [0.1,0.2], . . . , [0.9,1]}. In embodiments, each point from the graphical representation belongs to one of those squares. Accordingly, the confidence of quality module 135 includes the graphical representation of small subsets, which is represented as histogram graphs at each plotted point in the graphical representation. In other words, each stack represents how many points are in a sub-square. An example of the confidence of quality graph is shown in FIG. 7.

In further embodiments of FIG. 4, the confidence of quality module 135 normalizes the graphical representation to [0,1] by taking a percentage of points belonging to each square and finding the nearest local maximum from point (0,0) and a global maximum of that histogram. For example, the confidence of quality module 135 generates a d_nlm value which is a distance from (0,0) to a nearest local maximum on the plane XxY. The confidence of quality module 135 also generates a h_nlm which is a height (i.e., Z value) of a nearest local maximum. In aspects of the present invention, the confidence of quality module 135 also generates the D_gm and H_gm values, which represent a distance and height value, respectively, from a global maximum of function. Accordingly, the confidence of quality module 135 calculates a confidence of quality level (cql) as a metric using Equation 10 below:

$$cql = (\text{h\_nlm} * (\sqrt{2} - \text{d\_nlm}))/(\sqrt{2} * \text{H\_gm}). \qquad \text{(Equation 10)}$$

In embodiments of Equation 10, the cql value is small (i.e., far from a focal point) in response to a value of d_nlm being high or a value of h_nlm being small. In further embodiments of Equation 7, the cql value is high (i.e., close to the focal point) in response to the value of d_nlm being small or a value of h_nlm being close to a value of H_gm. In further embodiments, the confidence of quality module 135 calculates the cql value to address a lack of business expertise in a quantum computing field in a quantitative way. In aspects of the present invention, the confidence of quality module 135 outputs the cql to the threshold module 140.

In embodiments of FIG. 4, the threshold module 140 compares the cql value to a threshold. The threshold module 140 proceeds with a risk management process in response to the cql value being below the threshold. In further embodiments, the threshold module 140 executes a cryptography algorithm for risk management in response to proceeding with the risk management process. In this situation, the cql value is within acceptable limits such that there is no security risk associated with a data breach.

In further embodiments of FIG. 4, the threshold module 140 sends the cql value for review by a risk management subject matter expert (SME) in response to the cql value being equal to or above the threshold. In this situation, the cql value is not within acceptable limits and needs to be reviewed by a risk management SME in order to analyze the next steps that need to be taken for a potential security risk. In an aspect of the present invention, the risk management SME provides a recommendation for reducing or eliminating the potential security risk in response to reviewing the cql value. In further embodiments, the risk management SME implements a risk management plan for reducing or eliminating the potential security risk in response to reviewing the cql value.

In aspects of the present invention, the quantum risk assessment system 100 nominates additional risk assessments that fall within a neighbor analysis to determine factors that impact business goals, an emergence of quantum technology availability, and potential threats. Further, the quantum risk assessment system 100 allows for risk practitioners to evaluate a calculated confidence quality metric to determine if it is higher or lower than a business cryptology threshold. Accordingly, the quantum risk assessment system 100 allows for practitioners to revisit assessed risks and consult with SMEs for appropriate actions. In further embodiments, the quantum risk assessment system 100 nominates K nearest neighbors from a database of historical risk assessments based on defined metrics and calculates confidence of quality of risk assessments according to the definition of the metrics.

FIGS. 5 and 6 show examples of neighbors nomination graphs of the quantum risk assessment system in accordance with aspects of the present invention. FIG. 5 shows a neighbors nomination graph 150 which includes the risk assessment attributes dimension metric α on the y-axis and the final metric p on the x-axis. In FIG. 6, a plurality of neighbors nomination graphs 160 include a graph in which the risk assessment attribute dimension metric α is zero, a graph in which the final metric p is zero, a graph in which the neighbors nomination is within a certain angle, a graph in which the neighbors nomination is within a certain square shape, and a graph in which the neighbors nomination is within k nearest neighbors.

FIG. 7 shows an example of a confidence of quality graph of the dynamic optimization system in accordance with aspects of the present invention. In FIG. 7, the confidence of quality graph 170 comprises subsets of a square, which is represented as histogram graphs at each plotted point in the graphical representation.

Figure 8:
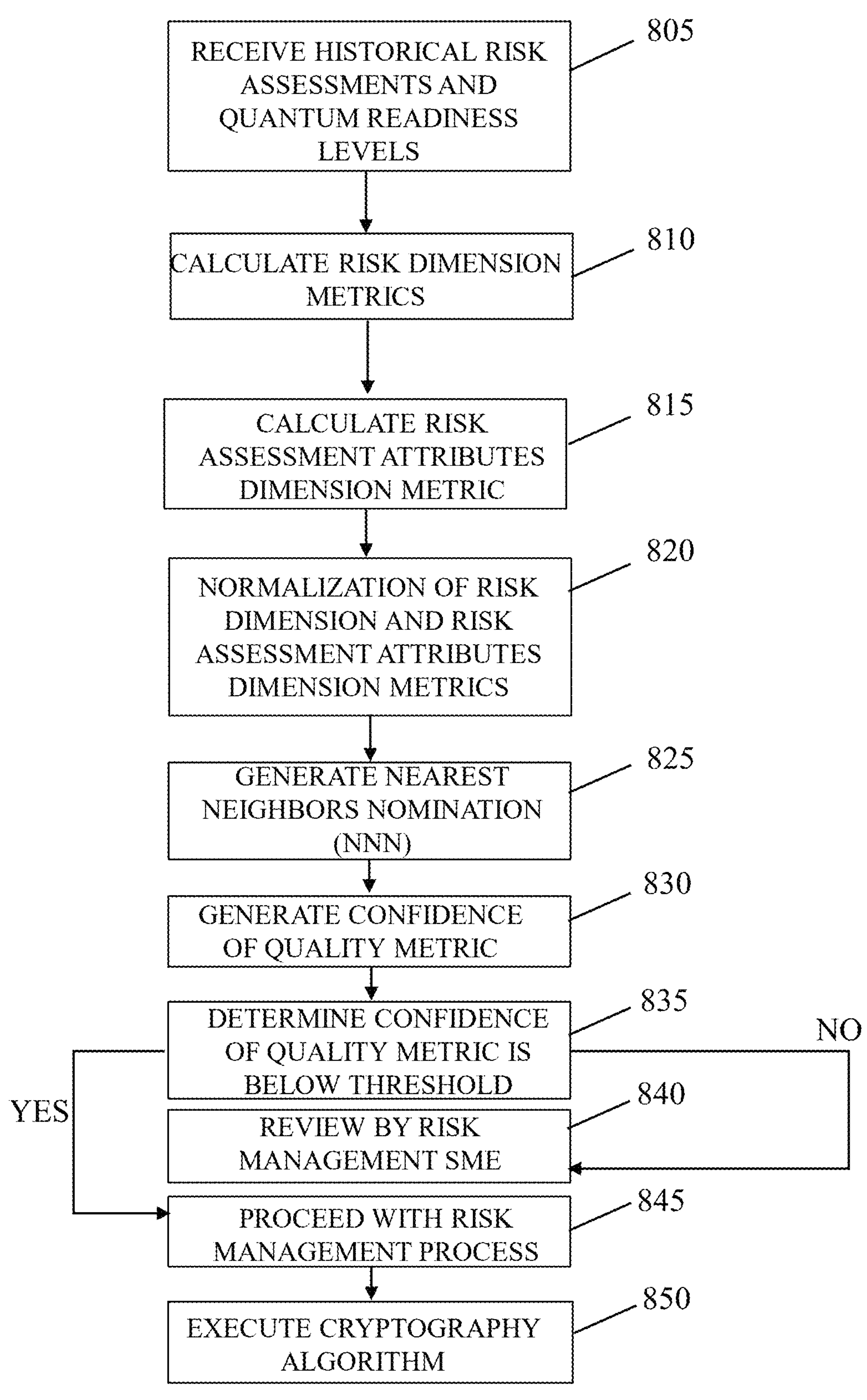
FIG. 8 shows a flowchart of an exemplary method of the quantum risk assessment system in accordance with aspects of the present invention.

FIG. 8 shows a flowchart of an exemplary method of the quantum risk assessment system in accordance with aspects of the present invention. Steps of the method may be carried out in the quantum risk assessment environment 105 of FIG. 4.

At step 805, the system receives, at the risk dimension module 110, historical risk assessments and quantum readiness levels. In embodiments and as described with respect to FIG. 4, the risk dimension module 110 receives the historical risk assessments and quantum readiness levels from an external system.

At step 810, the system calculates, at the risk dimension model 110, a first risk dimension metric p_1, a second risk dimension metric p_2, a third risk dimension metric p_3, and a final metric p. At step 815, the system calculates, at the risk assessment attributes dimension module 115, a risk assessment attributes dimension metric $\alpha$.

At step 820, the system normalizes, at the normalization module 120, the first risk dimension metric p_1, the second risk dimension metric p_2, the third risk dimension metric p_3, and the final metric p. At step 825, the system generates, at the neighbors nomination module 125, a nearest neighbors nomination (NNN) based on the risk assessment attributes dimension metric $\alpha$ and the final metric p. At step 830, the system generates, at the confidence of quality module 135, a confidence of quality metric based on the nearest neighbors nomination (NNN).

At step 835, the system determines, at the threshold module 140, that a value of the confidence of quality metric is below a threshold. At step 840, the system sends, at the threshold module 140, the value of the confidence of quality metric to a risk management subject matter expert (SME) for review in response to the value of the confidence of quality metric being equal to or above the threshold.

At step 845, the system proceeds, at the threshold module 140, with a risk management process in response to the value of the confidence of quality metric being below the threshold. At step 850, the system executes, at the threshold module 140, a cryptography algorithm for risk management in response to the value of the confidence of quality metric in response to the system proceeding with the risk management process.

Figure 9:
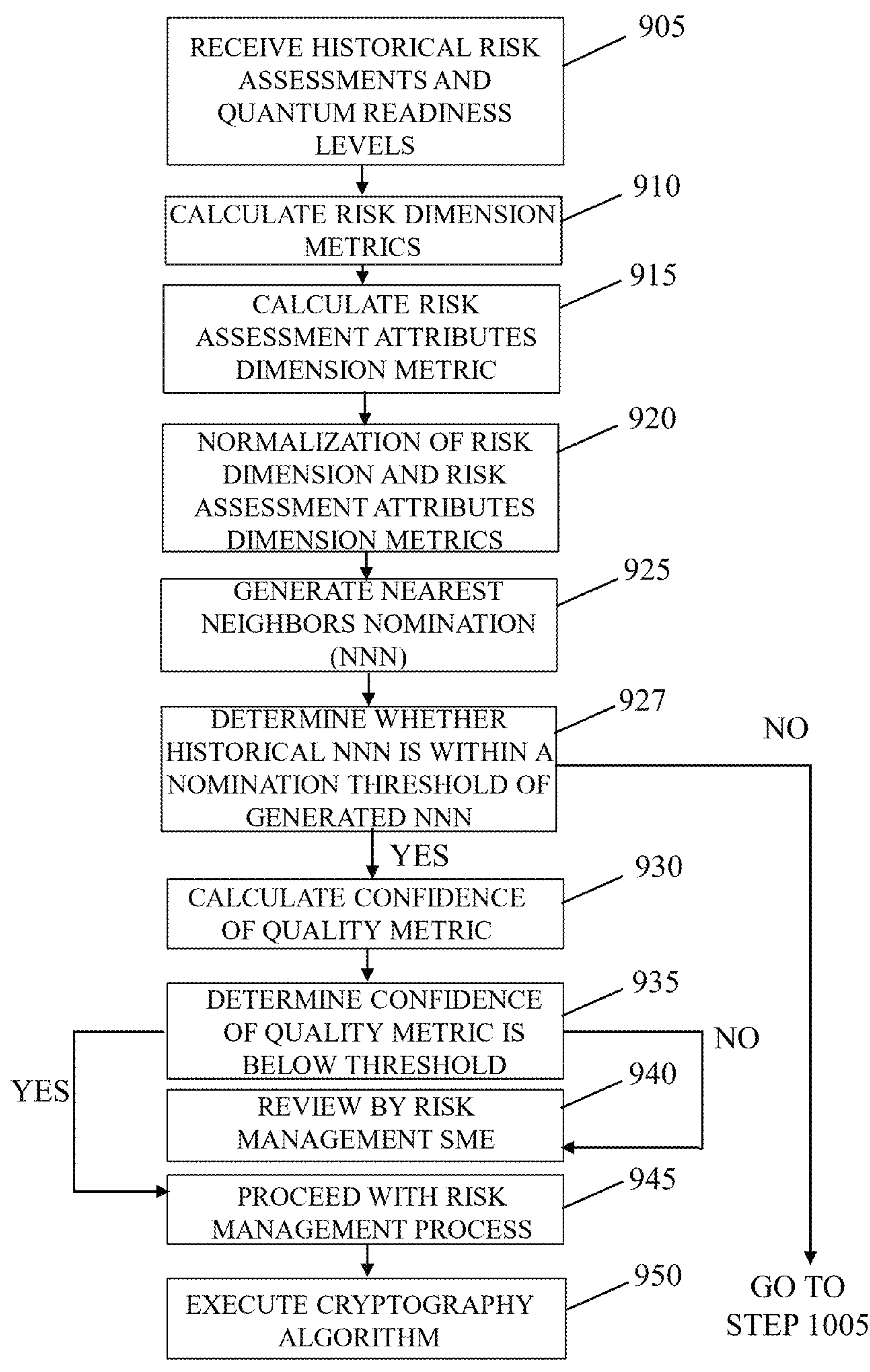
FIG. 9 shows another flowchart of an exemplary method of the quantum risk assessment system in accordance with aspects of the present invention.

FIG. 9 shows a flowchart of an exemplary method of the quantum risk assessment system in accordance with aspects of the present invention. Steps of the method may be carried out in the quantum risk assessment environment 105 of FIG. 4.

At step 905, the system receives, at the risk dimension module 110, historical risk assessments and quantum readiness levels. In embodiments and as described with respect to FIG. 4, the risk dimension module 110 receives the historical risk assessments and quantum readiness levels from an external system.

At step 910, the system calculates, at the risk dimension model 110, a first risk dimension metric p_1, a second risk dimension metric p_2, a third risk dimension metric p_3, and a final metric p. At step 915, the system calculates, at the risk assessment attributes dimension module 115, a risk assessment attributes dimension metric $\alpha$.

At step 920, the system normalizes, at the normalization module 120, the first risk dimension metric p_1, the second risk dimension metric p_2, the third risk dimension metric p_3, and the final metric p. At step 925, the system generates, at the neighbors nomination module 125, a nearest neighbors nomination (NNN) based the risk assessment attributes dimension metric $\alpha$ and the final metric p.

At step 927, the system determines, at the neighbors nomination module 125, whether the historical neighbors nomination is within a nomination threshold value of the generated nearest neighbors nomination. At step 930, the system calculates, at the confidence of quality module 135, a confidence of quality metric in response to the historical neighbors nomination being within the nomination threshold value of the generated nearest nomination. The system moves to step 1005 in response to the historical neighbors nomination not being within the nomination threshold value of the generated nearest nomination.

At step 935, the system determines, at the threshold module 140, whether a value of the confidence of quality metric is below a threshold. At step 940, the system sends, at the threshold module 140, the value of the confidence of quality metric to a risk management subject matter expert (SME) for review in response to the value of the confidence of quality metric being equal to or above the threshold.

At step 945, the system proceeds, at the threshold module 140, with a risk management process in response to the value of the confidence of quality metric being below the threshold. At step 950, the system executes, at the threshold module 140, a cryptography algorithm for risk management in response to the value of the confidence of quality metric in response to the system proceeding with the risk management process.

Figure 10:
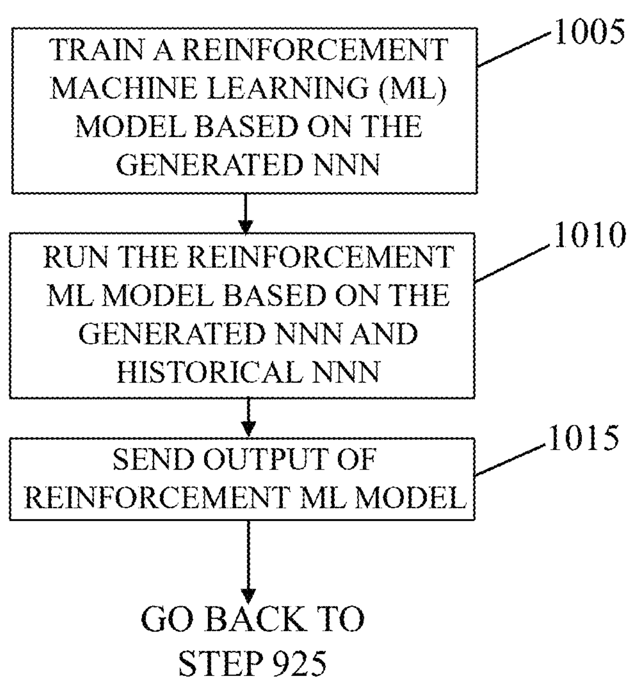
FIG. 10 shows another flowchart of an exemplary method of the quantum risk assessment system in accordance with aspects of the present invention.

FIG. 10 shows a flowchart of an exemplary method of the quantum risk assessment system in accordance with aspects of the present invention. Steps of the method may be carried out in the quantum risk assessment environment 105 of FIG. 4. Further, step 1005 is performed in response to the historical neighbors nomination not being within the nomination threshold value of the generated nearest nomination in step 927.

At step 1005, the system trains, at the continual service loop module 130, a reinforcement machine learning (ML) model based on the generated nearest neighbors nomination. At step 1010, the system runs, at the continual service loop module 130, the reinforcement ML model to identify an optimal type of nearest nomination metric based on the generated nearest neighbors nomination and the historical nearest neighbors nomination. At step 1015, the system sends, at the continual service loop module 130, an output of the optimal type of nearest nomination metric to the neighbors nomination module 125 for generating an optimized neighbors nomination in step 925.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a computing device, a plurality of historical risk assessments and a plurality of quantum readiness levels;

calculating, by the computing device, a plurality of risk dimension metrics based on the plurality of historical risk assessments and the plurality of quantum readiness levels;

calculating, by the computing device, a plurality of risk assessment attributes dimension metrics based on the plurality of historical risk assessments and the plurality of quantum readiness levels;

generating, by the computing device, a nearest neighbors nomination based on the calculated plurality of risk dimension metrics and the calculated plurality of risk assessment attributes dimension metrics;

calculating, by the computing device, a confidence of quality metric based on the generated nearest neighbors nomination; and determining, by the computing device, that the confidence of quality metric is below a threshold; and executing, by the computing device, a cryptography algorithm based on a determination that the confidence of quality metric is below the threshold.

2. The method of claim 1, further comprising determining, by the computing device, that a historical nearest neighbors nomination is not within a nomination threshold of the generated nearest neighbors nomination.

3. The method of claim 2, further comprising training, by the computing device, a reinforcement machine learning (ML) model based on the generated nearest neighbors nomination.

4. The method of claim 3, further comprising running, by the computing device, the trained reinforcement ML model to output a type of nearest neighbor nomination metric based on the generated nearest neighbors nomination and the historical nearest neighbors nomination.

5. The method of claim 4, wherein the generating the nearest neighbors nomination is further based on the type of nearest neighbor nomination metric to improve an accuracy of the nearest neighbors nomination.

6. The method of claim 1, wherein the cryptography algorithm comprises an algorithm for risk management.

7. The method of claim 1, wherein the plurality of historical risk assessments and the plurality of quantum readiness levels are received from an external quantum computing system.

8. The method of claim 7, wherein the plurality of historical risk assessments are stored in a database in the external quantum computing system.

9. The method of claim 1, wherein the confidence of quality is further based on a height of a local maximum of a plurality of histogram graphs of the nearest neighbors nomination, a distance of the local maximum of the plurality of histogram graphs, and a height of a global maximum of function of the plurality of histogram graphs.

10. A computer program product comprising one or more computer readable storage media having program instructions collectively stored on the one or more computer readable storage media, the program instructions executable to:

receive a plurality of historical risk assessments and a plurality of quantum readiness levels;

calculate a plurality of risk dimension metrics based on the plurality of historical risk assessments and the plurality of quantum readiness levels;

calculate a plurality of risk assessment attributes dimension metrics based on the plurality of historical risk assessments and the plurality of quantum readiness levels;

generate a nearest neighbors nomination based on the calculated plurality of risk dimension metrics and the calculated plurality of risk assessment attributes dimension metrics;

calculate a confidence of quality metric based on the generated nearest neighbors nomination; and determine that the confidence of quality metric is below a threshold; and execute a cryptography algorithm based on a determination that the confidence of quality metric is below the threshold.

11. The computer program product of claim 10, wherein the program instructions are further executable to determine that a historical nearest neighbors nomination is not within a nomination threshold of the generated nearest neighbors nomination.

12. The computer program product of claim 11, wherein the program instructions are further executable to train a reinforcement machine learning (ML) model based on the generated nearest neighbors nomination.

13. The computer program product of claim 12, wherein the program instructions are further executable to run the trained reinforcement ML model to output a type of nearest neighbor nomination metric based on the generated nearest neighbors nomination and the historical nearest neighbors nomination.

14. The computer program product of claim 13, wherein the program instructions executable to generate the nearest neighbors nomination are further based on the type of nearest neighbor nomination metric to improve an accuracy of the nearest neighbors nomination.

15. The computer program product of claim 10, wherein the cryptography algorithm comprises an algorithm for risk management.

16. The computer program product of claim 10, wherein the plurality of historical risk assessments and the plurality of quantum readiness levels are received from an external quantum computing system.

17. The computer program product of claim 16, wherein the plurality of historical risk assessments are stored in a database in the external quantum computing system.

18. The computer program product of claim 10, wherein the confidence of quality metric is further based on a height of a local maximum of a plurality of histogram graphs of the nearest neighbors nomination, a distance of the local maximum of the plurality of histogram graphs, and a height of a global maximum of function of the plurality of histogram graphs.

19. The computer program product of claim 10, wherein the threshold comprises a business cryptography threshold.

20. A system comprising:

a processor, a computer readable memory, one or more computer readable storage media, and program instructions collectively stored on the one or more computer readable storage media, the program instructions executable to:

receive a plurality of historical risk assessments and a plurality of quantum readiness levels;

calculate a plurality of risk dimension metrics based on the plurality of historical risk assessments and the plurality of quantum readiness levels;

calculate a plurality of risk assessment attributes dimension metrics based on the plurality of historical risk assessments and the plurality of quantum readiness levels;

generate a nearest neighbors nomination based on the calculated plurality of risk dimension metrics and the calculated plurality of risk assessment attributes dimension metrics;

determine that a historical nearest neighbors nomination is not within a nomination threshold of the generated nearest neighbors nomination;

train a reinforcement machine learning (ML) model based on the historical nearest neighbors nomination not being within the nomination threshold of the generated nearest neighbors nomination;

calculate a confidence of quality metric based on the generated nearest neighbors nomination; and determine that the confidence of quality metric is below a threshold; and execute a cryptography algorithm based on a determination that the confidence of quality metric is below the threshold.

21. The system of claim 20, wherein the program instructions are further executable to run the trained reinforcement ML model to output a type of nearest neighbor nomination metric based on the generated nearest neighbors nomination and the historical nearest neighbors nomination.

22. The system of claim 21, wherein the cryptography algorithm comprises an algorithm for risk management.

23. A method, comprising:

receiving, by a computing device, a plurality of historical risk assessments and a plurality of quantum readiness levels;

calculating, by the computing device, a plurality of risk dimension metrics based on the plurality of historical risk assessments and the plurality of quantum readiness levels;

calculating, by the computing device, a plurality of risk assessment attributes dimension metrics based on the plurality of historical risk assessments and the plurality of quantum readiness levels;

generating, by the computing device, nearest neighbors nomination based on the calculated plurality of risk dimension metrics and the calculated plurality of risk assessment attributes dimension metrics;

determining, by the computing device, that a historical nearest neighbors nomination is not within a nomination threshold of the generated nearest neighbors nomination;

training a reinforcement machine learning (ML) model based on the historical nearest neighbors nomination not being within the nomination threshold of the generated nearest neighbors nomination;

running the trained reinforcement ML model to output a type of nearest neighbor nomination metric based on the training of the reinforcement ML model;

calculating, by the computing device, a confidence of quality metric based on the generated nearest neighbors nomination;

determining, by the computing device, that the confidence of quality metric is below a threshold; and executing, by the computing device, a cryptography algorithm based on a determination that the confidence of quality metric is below the threshold.

24. The method of claim 23, wherein the program instructions executable to generate the nearest neighbors nomination are further based on the type of nearest neighbor nomination metric to improve an accuracy of the nearest neighbors nomination.

25. A computer program product comprising one or more computer readable storage media having program instructions collectively stored on the one or more computer readable storage media, the program instructions executable to:

receive a plurality of historical risk assessments and a plurality of quantum readiness levels;

calculate a plurality of risk dimension metrics based on the plurality of historical risk assessments and the plurality of quantum readiness levels;

calculate a plurality of risk assessment attributes dimension metrics based on the plurality of historical risk assessments and the plurality of quantum readiness levels;

generate a first nearest neighbors nomination based on the calculated plurality of risk dimension metrics and the calculated plurality of risk assessment attributes dimension metrics;

determine that a historical nearest neighbors nomination is not within a nomination threshold of the generated first nearest neighbors nomination;

train a reinforcement machine learning (ML) model based on the historical nearest neighbors nomination not being within the nomination threshold of the generated first nearest neighbors nomination;

run the trained reinforcement ML model to output a type of nearest neighbor nomination metric based on the training of the reinforcement ML model;

generate a second nearest neighbors nomination based on the type of nearest neighbor nomination metric;

calculate a confidence of quality metric based on the generated second nearest neighbors nomination;

determine that the confidence of quality metric is above a threshold; and review the confidence of quality metric based on a determination that the confidence of quality metric is above the threshold.

* * * * *